May 26, 1942.    H. C. HOWSAM    2,284,426
SPOOL
Filed June 22, 1940
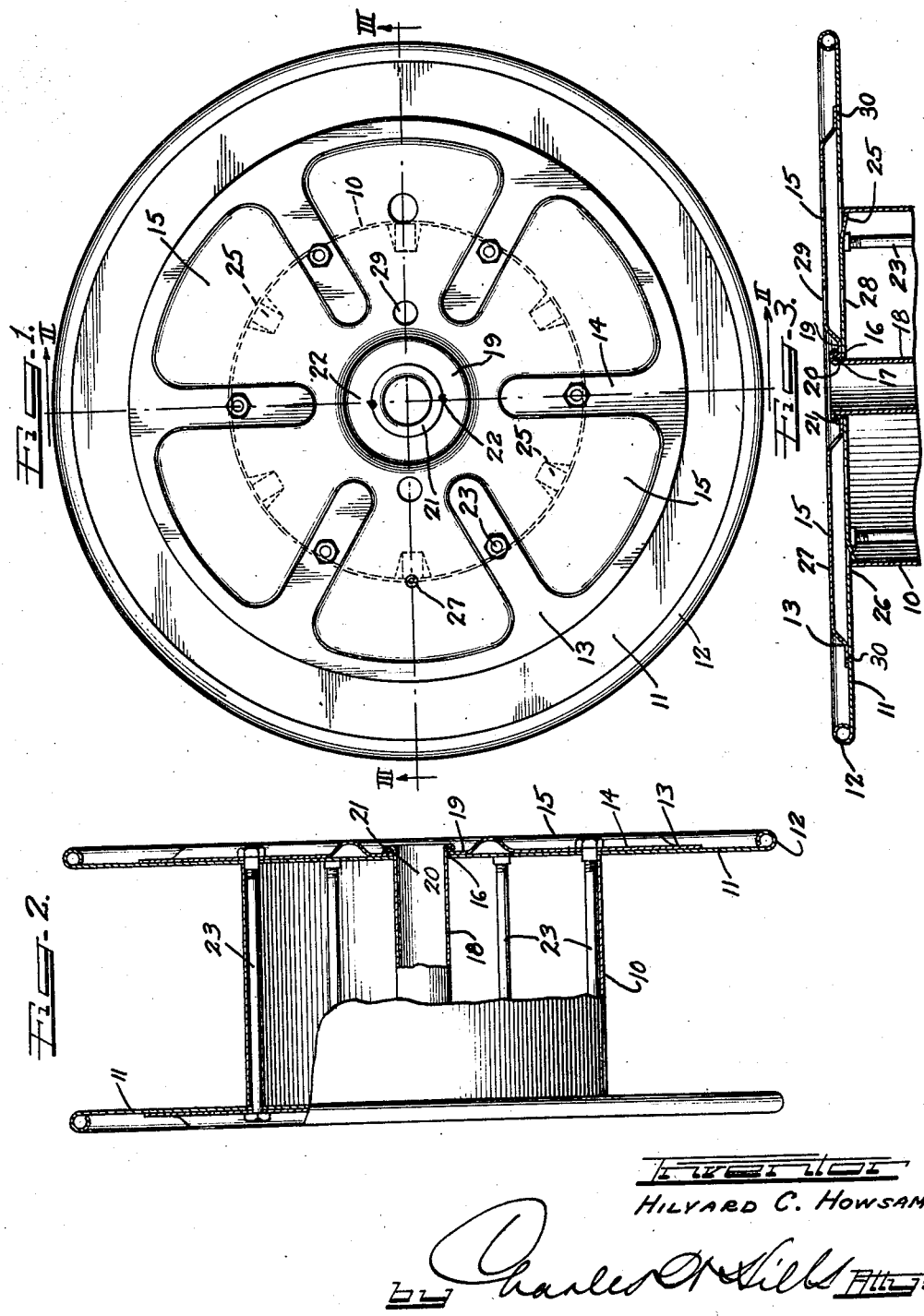
Inventor
HILYARD C. HOWSAM.

Patented May 26, 1942

2,284,426

UNITED STATES PATENT OFFICE 2,284,426

SPOOL

Hilyard C. Howsam, Chicago, Ill., assignor to Hubbard Spool Company, Chicago, Ill., a corporation of Illinois Application June 22, 1940, Serial No. 341,841

1 Claim. (Cl. 242—123)

My invention relates to spools formed of comparatively light sheet metal parts so constructed and associated that the spool will be comparatively light but will have a large capacity and will be resistant to distortion and bending under service or against rough handling or blows.

My improved construction is fully disclosed by the drawing, in which drawing:

Figure 1 is an end elevation of the spool;

Figure 2 is a side view partly in section on plane II—II Figure 1; and

Figure 3 is a section on plane III—III Figure 1.

The spool shown comprises the barrel 10 which may be a length of sheet metal tubing or may be formed from a blank of sheet metal.

Each of the spool heads comprises an inner or main sheet metal plate or disk 11 having its peripheral portion curled around into circular cross section to provide a strengthening tire part 12. Each head comprises also an outer strengthening plate 13 of circular form and of less diameter than the inner plate, the peripheral portion of the outer plate being secured, as by spot welding indicated at 30 in Figure 3, against and to the inner plate, the outer plate within its peripheral portion being spaced away from the inner plate except for comparatively narrow radially extending portions 14 which are deflected inwardly to engage against the inner plate thus leaving comparatively wide dovetail-shaped portions 15 spaced away from the inner plate but with their outer surfaces flush with the outer surface of the tire part 12 of the inner plate.

Each inner plate has the axial opening 16 therethrough and the outer plate 13 has a registering opening 17, these openings forming passageways for receiving the end of the inner or arbor tube 18 extending through the barrel 10. The deflected portions 14 of the outer plate 13 terminate short of the openings 17 to leave the annular portions 19 which abut the inner plate 12. The opening 17 is through this part 19 of the outer plate and the material around the opening is deflected outwardly to form a short annular flange 20 surrounding the opening 17. When the spool is assembled, the barrel 10 is engaged at its ends by the inner plates 12 of the heads and the inner tube 18 is inserted through the respective openings 16 and 17 and the end portions 21 of the inner tube are then deflected around the flanges 20, such deflection causing the inner tube to hold the head securely against the barrel end. In order to further strengthen the heads and inner tube against relative rotational movement, the ends 21 of the tube and the flanges 20 of the outer plate may be spot welded together as indicated at 22.

To rigidly secure the heads to the barrel, bolts 23 are employed which extend through holes provided in the inner plates 11 and the deflected or depressed portions 14 of the outer plates, the bolts extending along the inner side of the barrel and with their heads and nuts within the channels formed by the depressed portions 14 so as to be within the planes of the outer surfaces of the outer plate portions 15 so that they will be protected and will not interfere with the turning of the spool on a support, or with stacking of spools.

In order to assure maintenance of accurate concentric alignment of the barrel and head, the inner plates 11 have tongues 25 deflected or extruded therefrom with their outer ends forming seats engaged by the inner side of the barrel at the end thereof. These tongues are preferably disposed at points between the bolts 23 so that the bolts, together with the tongues, will accurately hold the barrel concentric with the head and will maintain the cylindrical form of the barrel.

Aligned holes 26 and 27 are provided in the inner and outer plates to form a passageway adjacent the outer side of the barrel at one end thereof for receiving the starting end of wire or other material to be wound on the spool.

At points inside of the barrel aligned openings 28 and 29 are provided in the inner plates and in the spaced away portion 15 of the outer plates, these aligned openings forming passageways for pins on arbor or other supporting structures on which the spool is mounted, for driving of the spool.

I thus produce a light but comparatively strong and rigid metal spool which can be economically manufactured and assembled and in which the outer surfaces of the outer plates and the outer surface of the tires 12 provide extensive areas for accurate seating of the spool on a support, or for efficient stacking purposes, the ends of the bolts being adequately protected. I do not, however, desire to be limited to the exact construction and arrangement shown and described, as changes and modifications may be made without departing from the scope of the invention.

I claim as follows:

A metal spool comprising a pair of axially spaced heads, each of said heads comprising a straight flat inner plate having a central opening and a reinforcing outer plate of less diameter than said inner plate and having a central opening bounded by an outturned axial flange integral with said outer plate, a tube extending axially of said spool and having ends entered in the openings and bent about said flange and welded to said outer plate, a barrel extending axially of said spool and with its ends engaging said inner plates, bolts within said barrel and retaining said inner and outer plates in clamped relation to said barrel, said outer plate having a flat peripheral portion lying against said inner plate and welded thereto, and having a flat annular portion adjacent said flange, inwardly directed and peripherally spaced radial flat portions extending from the peripheral portion of said outer plate and bounded by raised portions of said outer plate in spaced opposed relation to said inner plate to define a plurality of channels, and the ends of said bolts being positioned in said channels and guarded by said raised portions.

HILYARD C. HOWSAM.